United States Patent [19]
Hopkins

[11] Patent Number: 5,182,879
[45] Date of Patent: Feb. 2, 1993

[54] CRAWLING INSECT TRAP

[76] Inventor: George I. Hopkins, 1590 Spring Grove Rd., Hollister, Calif. 95023

[21] Appl. No.: 770,588

[22] Filed: Oct. 3, 1991

[51] Int. Cl.⁵ ............................................. A01M 1/20
[52] U.S. Cl. ..................................................... 43/131
[58] Field of Search .......................... 43/107, 121, 131

[56] References Cited

U.S. PATENT DOCUMENTS

| | | | |
|---|---|---|---|
| 1,019,543 | 3/1912 | Smoot | 43/131 |
| 1,309,606 | 7/1919 | Bartholomew | 43/131 |
| 2,328,591 | 9/1943 | Weil | 43/131 |
| 2,340,256 | 1/1944 | Weil | 43/131 |
| 2,808,679 | 10/1957 | Collins | 43/131 |
| 4,281,471 | 8/1981 | Jenkins | 43/131 |
| 4,349,981 | 9/1982 | Sherman | 43/131 |
| 4,753,032 | 6/1988 | Sherman | 43/131 |
| 4,782,622 | 11/1988 | Roberts | 43/131 |
| 4,807,391 | 2/1989 | Bokiau | 43/131 |
| 4,908,976 | 3/1990 | Dagenais | 43/131 |
| 4,952,401 | 8/1990 | Hobbs | 424/405 |
| 5,042,194 | 8/1991 | Cohen | 43/107 |

FOREIGN PATENT DOCUMENTS 2457444 12/1974 Fed. Rep. of Germany ........ 43/333

Primary Examiner—Kurt C. Rowan
Attorney, Agent, or Firm—Thomas E. Schatzel; James J. Leary

[57] ABSTRACT

A crawling insect trap comprising a tube and perforated wicks. The wick contains one or more bioactive compounds, among which may be poisons, attractants and birth control agents. The outer surface of the tube is coated with an unpalatable agent to deter children and animals from eating the trap. The trap is color coded to allow rotation of active agents. An adhesive strip is provided to facilitate placement of the trap.

20 Claims, 1 Drawing Sheet

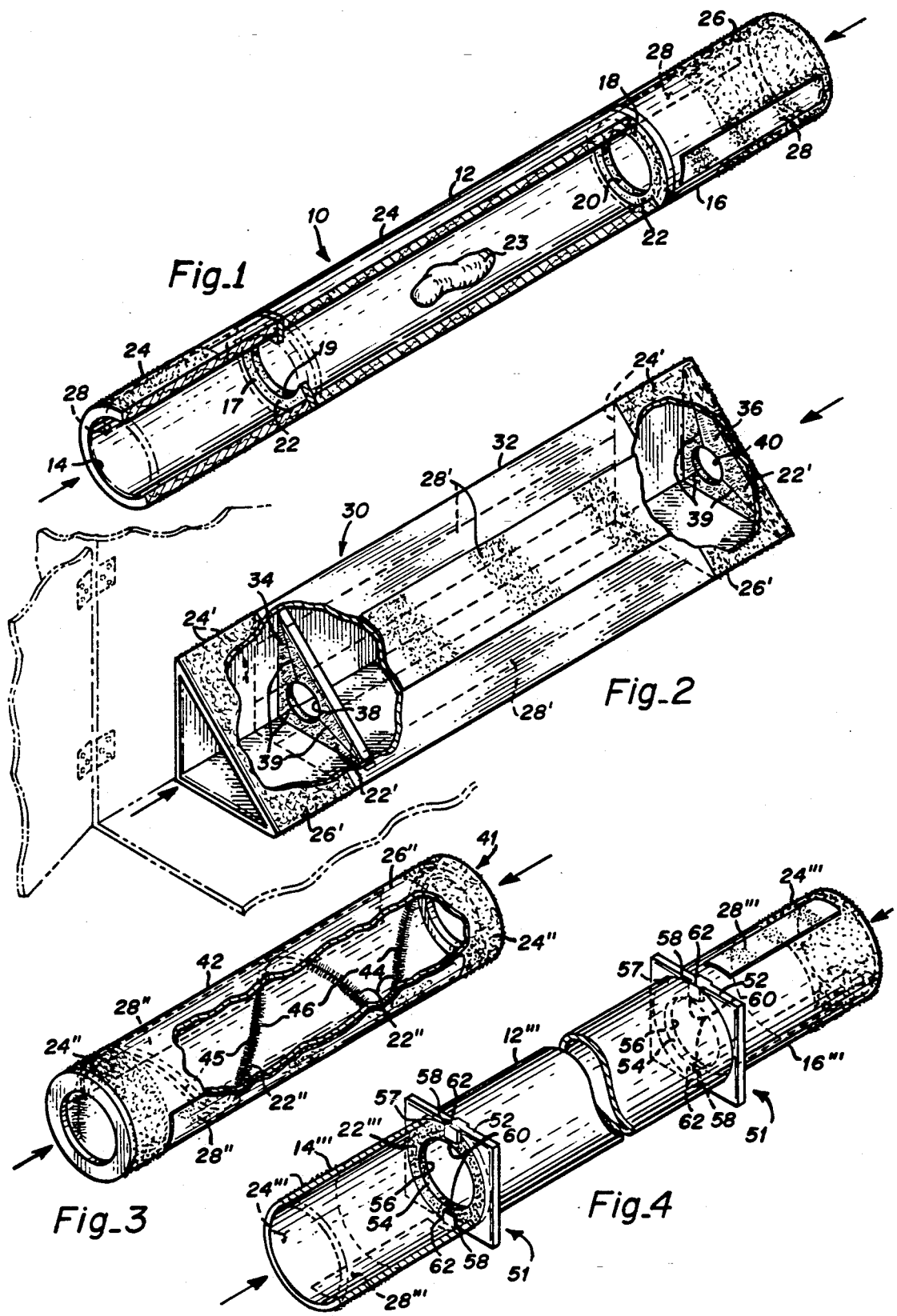

CRAWLING INSECT TRAP

BACKGROUND OF THE INVENTION

1. Field of the Invention

The present invention relates generally to crawling insect traps and more particularly to insect traps using the grooming behaviors of the insect to facilitate application of a biological agent.

2. Description of the Prior Art

A common approach to killing insects, e.g. cockroaches is to spray infested areas with a pesticide. This method entails removing foodstuffs, dishes, etc. from the cupboards and other areas to be sprayed. If the infestation is in an apartment building, the insects can merely migrate from apartment to apartment, resulting in rapid reinfestation of the sprayed area.

An additional problem with spraying pesticides is that they contaminate living areas, thereby exposing people to unnecessary health hazards. This pollution of living areas and the environment necessarily limits the choice of pesticides.

One method of approaching the noted problems is to attract the insect to a certain area and apply the poison to the insect within that habitat. The use of small structures to simulate the preferred habitat of cockroaches is well known. Commonly, the structure consists of a small, hollow rectangular column which provides a dark, close environment.

The cockroach will enter the structure and encounter the poison within. Usually, the poison is placed on the floor of the structure and will be ingested by the cockroach when it grooms its feet.

A common problem with the prior art is that it relies primarily on foot contact with the poison to achieve its purpose. Optimally, the poison will, instead, be deposited firmly on both the feet and the antennae.

The antennae are used by the cockroach not only for grooming but also to sample its environment; much as a human would use a hand to gather in and taste food. Thus, a method of poison delivery that liberally coats the antennae will eventually administer more poison to the cockroach.

Although the prior art contains an example of the use of fibers to deliver poison from surfaces other than the floor, the individual fibers are disclosed as being rather coarse, such as hemp or steel wool, so that the fibers will stand away from the wall. The disadvantage of this arrangement is that coarse fibers do not provide the coverage that finer fibers provide; much as a fine paint brush covers better than a coarse one.

The prior art acknowledges the value of safety in the use of poison traps, but relies on mechanical means to prevent the poison from escaping the structure. Although generally effective for this purpose, the problem of the trap being chewed through by children or animals remains.

The prior art is placed in the intended position and left there to work. Unfortunately, an unsecured device is subject to movement and must be placed on a flat, horizontal surface. Unwanted movement may lead to failure of the device or to increased safety hazards.

The prior art of U.S. Pat. Nos. 2,328,591 and 2,340,256 granted to Weil contemplates the use of a single poison on traps of a given design. This has the disadvantage of allowing those cockroaches resistant to the poison to survive and reproduce while removing susceptible cockroaches from the gene pool. Over time, the cockroach population will be composed of primarily resistant cockroaches and the trap will lose its effectiveness.

The prior art discloses the use of poisons which act directly to kill the cockroach. If, instead, an agent were used which inhibits cockroach reproduction more effective population control may result.

SUMMARY OF THE PRESENT INVENTION

It is therefore an object of the present invention to provide a cockroach trap that maximizes the ingestion of poison by providing increased delivery of poison to the antennae of the cockroach.

It is another object of the invention to provide a trap which deters children and animals from chewing on the trap, opening it and ingesting poison.

It is a further object of the invention to provide a trap which allows for the use of a broad spectrum of poisons within the system and multiple poisons within each style of trap, thus reducing the risk that significant resistance may be developed to any one poison used by the cockroach trap system.

Briefly, in a preferred embodiment, the present invention comprises multiple tubes placed end to end with a felt wick placed between adjoining tubes. The felt wicks each contain a small hole, of a size that allows a cockroach to pass through but small enough that the antennae, feet and other parts of the insect come into intimate and somewhat prolonged contact with the surface of the wick.

The wick is adapted for saturation with a bioactive compound. As the insect passes through the hole, the compound will coat the antennae, feet and other parts of the insect. The cockroach's instinctive grooming and sampling behavior then results in ingestion of the compound. The insect is attracted to the device because of its dark interior and close confines. An attractant, such as a pheromone may also be used.

For increased safety against a child or animal coming into contact with the poison, the exterior of the tube is coated with a bitter-tasting, non-toxic agent.

The casing of the structure may be color coded to allow the systematic use of different chemical formulations. By rotating the agents used, the possibility of the development of resistance to any one agent is reduced.

An adhesive surface is applied to the tubing to allow for external securement to a panel.

In an alternate embodiment, the disc-shaped wicks are replaced by an elongated wick of a shape similar to that of a pipe cleaner in design which is formed into a spiral and inserted into the tube.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a partially cut-away, perspective view of the preferred embodiment of the present invention;

FIG. 2 is a partially cut-away perspective view of a first alternative embodiment of the present invention;

FIG. 3 is a partially cut-away perspective view of a second alternative embodiment of the present invention; and FIG. 4 is a perspective view of an alternative poison carrier.

DETAILED DESCRIPTION OF THE PREFERRED EMBODIMENT

FIG. 1 shows a partially cut-away view of a crawling insect trap, of the present invention and is referred to by the general reference numeral 10. The trap 10 comprises a central hollow cylindrical tube 12 and a pair of hollow side cylindrical tubes, 14 and 16. Interposed between the ends of the central hollow tube 12 and each of the tubes 14 and 16 are circular perforate discs, 17 and 18 having holes 19 and 20 respectively. The discs 17 and 18 are comprised of a material, e.g. a cloth felt, capable of permeation by a bioactive compound 22.

The compound 22 may be of various types. For example, it may be selected of a material capable of killing cockroaches or of a material which inhibits reproduction by such insects. The type of material may vary depending on the type of insect to be destroyed. Additionally, boric acid dough 23 may be placed on the interior surface of the central tube 12 as a poison.

Various materials may be used to construct the elements of the trap 10. For example, the discs 17 and 18 may be composed of a felt-like material about a cardboard ring. The tubes 12, 14, and 16 may be comprised of a heavy paper or cardboard type material such that it is of low cost and may be manufactured in large volumes; and packaged in multiples per package for ease of shipment, resale displays and pre-use storage by a consumer.

The external surfaces of the tubes 12, 14 and 16 are coated with a non-toxic unpalatable compound 24 which is also color coded. An adhesive strip 28 is placed on the outer surface of one or more of the tubes 12, 14 and 16.

The unpalatable, non-toxic compound 24 may be selected from the class of compounds known as bittering agents or aversive agents, a variety of denaturants which by virtue of their extremely vile taste render any substance to which they are added unpalatable. Suitable compounds include, but are not limited to, Denatonium Benzoate and Denatonium Saccharide which are used as denaturants for alcohol and other chemicals to deter their accidental ingestion by people or animals. The selection or formulation of these compounds is not considered to be an important part of the present invention. Those who wish to learn more about the formulation of these substances may do so by referring to U.S. Pat. Nos. 3,080,327; 3,268,577; 4,064,316; 4,296,139; 4,652,577 and 4,661,504.

In manufacture, the tubes 12, 14 and 16 can be separately manufactured; the discs 17 and 18 are separately manufactured and impregnated with the compound 22, and then the discs 17 and 18 inserted and the abutting ends of the tubes 12, 14 and 16 fastened with an adhesive to form a composite tube 10. Several of the traps 10 can then be packaged together in a common package for ultimate purchase by a user consumer. The compound 22 can further include an attractant such as a pheromone that attracts insects such as cockroaches. Likewise, the interior of one or more of the tubes 12, 14 and 16 may be coated, at least in part, by the attractant substance.

FIG. 2 shows a partial cut-away view of an alternative embodiment of the present invention and is designated by the general reference numeral 30. Those elements similar to FIG. 1 carry the same reference numeral distinguished by a prime designation. The trap 30 comprises a triangular shaped hollow tube 32. Near or at the ends of the triangular hollow tube 32 are triangular planar wicks, 34 and 36, having holes 38 and 40. Both the triangular shaped hollow tube 32 and the triangular planar wicks, 34 and 36 contain at least one ninety degree angle. The triangular planar wicks are permeated with the bioactive compound 22'. The external surfaces of the triangular hollow tube 32 are coated with the non-toxic unpalatable compound 24' and the colored identifier 26'. The adhesive strip 28' may be placed on the exterior surface of one of the walls forming the tube 30. The planar wicks 34 and 36 may be placed at the immediate end of the tube 32 or inserted within the tube. By selecting the dimensions properly, the wicks 34 and 36 will be held in place within the tube but allow for repositioning as desired. The interior of a cabinet is in phantom to illustrate mounting the trap 30 within the cabinet's interior. The planar wicks 34 and 36 include slits 39. Thus, if the body of the insect exceeds the size of holes 38 and 40, the tabs flex as the insect passes through. This provides added assurance that the insect contacts the compound 22'.

FIG. 3 shows a partially cut-away view of an alternative embodiment of the present invention and is designated by the general reference numeral 41. Those elements similar to FIG. 1 are distinguished by a double prime. Crawling insect trap 41 comprises a singular hollow tube 42. Within the hollow tube 42 is a spiral wick 44 having a central wire 45 supporting a fuzzy, felt-like surface 46. The surface 46 of the wick 44 is permeated with the bioactive compound 22''. The external surfaces of the hollow tube 42 is coated with the nontoxic unpalatable compound 24'' and the colored identifier 26''. The adhesive strip 28'' is placed on the back surface of the crawling insect trap 41.

The wick 44 is selected such that it abuts against the interior walls of the tube 42 and leaves a small central passage-way for the insect. This passage-way is within the interior of the spiral wick 42. Thus, once the insect, e.g. a cockroach enters enters the end of the trap 40, its antennae will come into contact with the felt surface of the wick. By making the trap 40 such that it is in the form of a partial donut or tire, the interior will be darker. Thus, cockroaches seeking the darkness will have a tendency to migrate to the dark interior. As the cockroaches move within the tube 42 their antennae contact the compound 24''. Once they put their antennae in contact with their mouths, such compound is ingested.

FIG. 4 shows a partially cut-away view of an alternative embodiment of the disc for the structure of FIG. 1. Those elements common to FIG. 1 carry the same reference numeral distinguished by a triple prime. In the structure of FIG. 4, a poison carrier structure referred to by the general reference character 51, comprises a rectangular platter 52 having a central hole 54. A pair of felt discs 56 and 57 coaxial with the hole 54 are placed on each surface of the platter 52. The outer diameter of the discs 56 and 57 is slightly less than the interior diameter of the tubes 12''' and 14'''. About the end of the tube 14''' are pair of notches 58 and about the end of the tube 12''' are a pair of notches 60. The platter 52 carries a pair of tabs 62 which have an exterior dimension compatible with the interior dimensions of the notches 58 and 60. Thus, the tabs 62 may be placed in the notches 58 such that disc 57 is in place. Then the notches 60 may be placed in alignment and abutment with the carrier 52. Adhesives are then used to secure the tubes 12''', 14''' and carrier 51 in a unitary structure. The discs 56 and 57 are impregnated with the poison 22'''. To attract the insects, the discs 56 and 57 may also carry an attracting compound such as a pheromone. Furthermore, the interior surfaces of the tubes 12''' and/or 14''' may support a layer of pheromone to attract the insects. The carrier 51 and the tubes 12''' and 14''' may all be separately manufactured. Assembly is simplified and alignment is readily achieved.

The advantages of the present invention may now be readily understood. The combination of the hollow tube and the perforated surfaces of a felt surface or spiral wick provide a dark, close environment preferred by the cockroach. The perforated surfaces with the central opening ensure coating of the antennae and feet of the cockroach with the bioactive compound as the insect penetrates within the structure.

The unpalatable, non-toxic compound coating deters children and animals from chewing on the trap structure and encountering the risk of the poison material with which the surfaces are permeated. The adhesive strip allows for securing placement of the trap, e.g., within a cupboard or other general area infested with the insect.

The color coding provides for easy identification of the bioactive compound and facilitates the rotation of the various compounds so as to avoid the building up of immunities within the insect population.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An insect trap comprising, in combination:
   an elongated structure forming a passage-way for an insect;
   a support member within the elongated structure and having a central opening for passage by an insect, the support member positioned to form surfaces substantially normal to the axis of the structure such that a path of travel of insects within the structure is through said central opening;
   a bioactive compound impregnated on a surface of the support member, whereby as an insect penetrates about said central opening, it contacts the compound;
   and a non-toxic, unpalatable compound coated about an exterior surface of the elongated structure whereby a child or animal is discouraged from the trap.

2. The insect trap of claim 1 wherein:
   the support structure is in contact with all interior walls of the structure; and
   the bioactive compound is impregnated on substantially all surfaces of the support structure.

3. The insect trap of claim 2, further comprising:
   an adhesive coated about an exterior surface of the elongated structure, whereby the trap may be secured in place to a support structure.

4. An insect trap comprising:
   a central hollow structure;
   a first perforated surface attached about a first end of the structure, the first surface having a central opening of a size compatible for an insect to pass through;
   a second perforated surface attached about a second end of the structure, the second surface having a second central opening of a size similar to that of said first central opening;
   a first side hollow structure fixedly attached about the first perforated surface and said first end of the central hollow structure, the first side hollow structure being in line with the central hollow structure;
   a second side hollow structure fixedly attached about the second perforated surface and said second end of the central hollow structure, the second side hollow structure being in line with the central hollow structure;
   a bioactive compound impregnated upon the first and second perforated surfaces, whereby as an insect penetrates about the first and second surfaces, it contacts the compound;
   and a non-toxic, unpalatable compound coated about an exterior surface of at least one of the first or second hollow structures.

5. The insect trap of claim 4, further comprising:
   an adhesive coating about an exterior surface of at least one of the first or second hollow structures.

6. The insect trap of claim 4 wherein,
   the bioactive compound is comprised of a substance lethal to cockroaches.

7. The insect trap of claim 4 wherein,
   the bioactive compound is comprised of a substance that inhibits the reproduction of cockroaches.

8. The insect trap of claim 4 wherein,
   the bioactive compound, is comprised of an insect attractant substance.

9. The insect trap of claim 4 wherein,
   at least portions of the exterior surface of the central, first or second hollow structures are color coded so as to indicate the nature of the bioactive compound.

10. The insect trap of claim 4 wherein,
    the interior surface of one of said tubes is coated with a bioactive, attractive compound, for instance a pheromone, that attracts cockroaches.

11. The insect trap of claim 4 wherein,
    the central, first and second hollow structures are cylindrical in cross-section; and
    the first and second perforated surfaces are disks having a circumference slightly less than the internal circumference of the structures.

12. The insect trap of claim 4 wherein,
    a portion of boric acid impregnated dough is placed upon the interior surface of the central hollow structure.

13. An insect trap comprising;
    a hollow, circular tube;
    a spiral wick extending longitudinally within and coaxial with the hollow tube and forming a central opening within the interior of such wicks;
    an unpalatable compound coating the exterior surface of the hollow structure; and
    a bioactive compound impregnated upon the wick.

14. The insect trap of claim 13, further comprising;
    an adhesive backing on one side of the hollow tube.

15. The insect trap of claim 13 wherein,
    the bioactive compound is comprised of a substance lethal to cockroaches.

16. The insect trap of claim 13 wherein, the bioactive compound is comprised of a substance that inhibits the reproduction of cockroaches.

17. The insect trap of claim 13 wherein, the bioactive compound is comprised of a substance that attracts cockroaches.

18. The insect trap of claim 13 wherein, the exterior surface of the hollow structure is colored so as to communicate the nature of the bioactive compound.

19. An insect trap comprising, in combination:

an elongated structure forming a passage-way for an insect, said elongated structure including at least two hollow, longitudinal supports, one of said two supports having a receiving notch about one terminal end, a support member within the elongated structure and having a central opening for passage by an insect, the support member positioned to form surfaces substantially normal to the axis of the structure such that a path of travel of insects within the structure is through said central opening, said support member having at least one tab member about the exterior for interposing with said receiving notch, whereby said support member may be interpositioned with the notch and intermediate the two longitudinal supports;

and a bioactive compound impregnated on a surface of the support member, whereby as an insect penetrates about said central opening, it contacts the compound.

20. An insect trap comprising, in combination:

an elongated structure forming a passage-way for an insect;

a bioactive compound impregnated on an interior surface of said elongated structure, whereby as an insect penetrates the interior of said elongated structure, it contacts the compound;

and a non-toxic, unpalatable compound coated about an exterior surface of said elongated structure whereby a child or animal is discouraged from the trap.

* * * * *